United States Patent [19]

Forrest

[11] Patent Number: 5,102,866
[45] Date of Patent: Apr. 7, 1992

[54] ADDITIVE FOR DRILLING FLUID

[76] Inventor: Gabriel T. Forrest, 5615 Inwood, Houston, Tex. 77056

[21] Appl. No.: 537,169

[22] Filed: Jun. 12, 1990

Related U.S. Application Data

[63] Continuation of Ser. No. 233,895, Aug. 15, 1988, abandoned, which is a continuation of Ser. No. 25,995, Mar. 16, 1987, abandoned, which is a continuation-in-part of Ser. No. 831,850, Feb. 24, 1986, abandoned.

[51] Int. Cl.⁵ ................................................ C09K 7/00
[52] U.S. Cl. .................................................... 507/104
[58] Field of Search .......................... 166/294; 175/72; 252/8.51, 8.512, 8.514; 507/104

[56] References Cited

U.S. PATENT DOCUMENTS

| | | | |
|---|---|---|---|
| 2,943,679 | 7/1960 | Scott et al. | 166/21 |
| 2,943,680 | 7/1960 | Scott et al. | 166/21 |
| 3,375,888 | 4/1968 | Lummus et al. | 175/72 |
| 3,629,102 | 12/1971 | Lummus et al. | 175/72 |
| 4,082,677 | 4/1978 | Zollar et al. | 252/8.5 B |
| 4,343,751 | 8/1982 | Kumar | 264/37 |
| 4,397,354 | 8/1983 | Dawson et al. | 175/72 |

Primary Examiner—Ivars Cintins
Attorney, Agent, or Firm—Arthur F. Zobal

[57] ABSTRACT

A by-product of peanut growing is utilized in the drilling fluid while drilling boreholes to reduce friction and to reduce the normal adverse effects inherent in such drilling fluid.

13 Claims, No Drawings

ADDITIVE FOR DRILLING FLUID

This is a continuation of co-pending application Ser. No. 07/233,895 filed Aug. 15, 1988, now abandoned, which is a continuation of application Ser. No. 07/025,995, filed Mar. 16, 1987 now abandoned, which is a continuation-in-part of application Ser. No. 06/831,850, filed Feb. 24, 1986 now abandoned.

SUMMARY OF THE INVENTION

Peanuts are used extensively for consumption by humans and by animals. A peanut plant provides hulls in which the peanuts are present and such hulls are added selectively to drilling fluid which may be either water-based or oil-based. The hulls are ground to a powder-like material and is added to the drilling fluid in a quantity ranging from one pound to forty pounds per barrel of fluid used in drilling. Adverse chemical effects on the borehole are minimized and friction on the drillpipe also is reduced through the material and method of the present invention. The exact particle size and amount of material will be determined by the applicable well conditions including the type of subterranean formations being drilled.

DETAILED DESCRIPTION

During drilling of wells, drilling fluid or mud is used to circulate and remove foreign matter from the borehole and to allow easier rotation of the drillpipe thereby minimizing power necessary to rotate the drillpipe and allowing faster drilling of the borehole thus requiring use of the drilling rig for a shorter period of time and consequently less expense.

Many drilling fluids have an adverse chemical effect on the formations encountered in drilling thereby providing undesirable chemical reactions in the borehole.

Hulls from peanut plants are ground to a powder material, placed in containers, and hauled to the well site where such material is added to the drilling fluid in a quantity of from about one pound to forty pounds per barrel of drilling fluid. The exact chemical reaction of the drilling fluid additive is not known but increased efficiency in the drilling rate and decreased adverse chemical reaction is provided.

Among the advantages in using the present invention are:
(1) Reduces wall cake permeability
(2) Seals off depleted sands and micro fractures
(3) Prevents seepage loss and stuck pipe
(4) Makes casing and logging run smooth
(5) Bio degradable and non-toxic
(6) Temperature is stable
(7) Reduces bit balling, drag, and torque
(8) Reduces shale and gumbo problems The present invention does not utilize peanuts or peanut skins and is used underground and not on the surface of the earth.

Thus, the present invention provides a compound, method, and system for improving drilling fluid.

Although a preferred embodiment of the invention has been described, it will be appreciated by those skilled in the art to which the present invention pertains that modifications, changes, and improvements may be made without departing from the spirit of the invention defined by the claims.

I claim:

1. A method for improving a water-based fluid used in drilling wells, said method comprising the steps of
   taking peanut hulls from peanut plants,
   grinding said peanut hulls to powder form, and
   adding the powdered peanut hulls to said drilling fluid.

2. A method for improving an oil-based fluid used in drilling wells, said method comprising the steps of
   taking peanut hulls from peanut plants,
   grinding said peanut hulls to powder form, and
   adding the powdered peanut hulls to said drilling fluid.

3. A product for use in the drilling of wells, said product comprising:
   a drilling fluid, and peanut hulls ground to powder form added to said drilling fluid.

4. A drilling fluid used in the drilling of wells in the ground, comprising:
   a drilling mud, and
   peanut hulls ground to a powder-like material added to said drilling mud.

5. The drilling fluid of claim 4 wherein said ground peanut hulls are added to said drilling mud in an amount of at least one pound per barrel of said drilling mud.

6. A well circulation fluid, comprising:
   a fluid to be circulated in a well extending into the ground, and
   peanut hulls ground to powder form added to said fluid.

7. A method for improving a well circulation drilling fluid, said method comprising the steps of:
   taking peanut hulls,
   grinding said peanut hulls to powder form, and
   adding the powdered peanut hulls to said drilling fluid.

8. The method of claim 7 wherein said peanut hulls prior to grinding are separated from the peanut meats.

9. The method of claim 7 wherein said ground peanut hulls are added to said drilling fluid in an amount of at least one pound per barrel of drilling fluid.

10. The method of claim 9 wherein said peanut hulls prior to grinding are separated from the peanut meats.

11. A method for improving a fluid used for circulation in a well extending into the ground, comprising the steps of:
    taking peanut hulls ground to powder form, and
    adding said peanut hulls ground to powder form to said fluid.

12. A method of improving a drilling fluid to be used for circulation in a well while drilling operations are carried out, comprising the steps of:
    taking peanut hulls ground to powder form, and
    adding said peanut hulls ground to powder form to said drilling fluid.

13. A method of improving a drilling mud to be used for circulation in a well while drilling operations are carried out, comprising the steps of:
    taking peanut hulls ground to powder form, and
    adding said peanut hulls ground to powder form to said drilling mud.

* * * * *